United States Patent Office 2,842,563
Patented July 8, 1958

2,842,563

PURIFICATION OF 2-T-BUTYLANTHRAQUINONE

Wilbie S. Hinegardner and Jerome W. Sprauer, Niagara Falls, N. Y., assignors to E. I. du Pont de Nemours & Company, Wilmington, Del., a corporation of Delaware No Drawing. Application September 28, 1954
Serial No. 458,972

7 Claims. (Cl. 260—369)

This invention relates to the purification of 2-t-butylanthraquinone. As obtained commercially, this compound contains substantial amounts, on the order of 0.2–0.8%, of unidentified impurities together with considerable anthraquinone, e. g., on the order of 2–4%. Such impurities are quite objectionable when present in 2-t-butylanthraquinone, hereinafter referred to simply as butylanthraquinone, intended for certain uses. Their presence is particularly objectionable when the butylanthraquinone is to be used as the intermediate in cyclic reduction-oxidation processes for producing hydrogen peroxide. In such processes, a solution of the intermediate is catalytically hydrogenated to produce butylanthrahydroquinone which is then oxidized. Oxidation regenerates the butylanthraquinone for recycling after the hydrogen peroxide simultaneously formed is separated by aqueous extraction.

Hydrogenation in processes of the above type is effected in the presence of a hydrogenation catalyst such as metallic palladium-on-activated alumina or metallic nickel, e. g., Raney nickel. The unidentified impurities in commercial butylanthraquinone adversely affect the activity of the hydrogenation catalyst and decrease its effective life. Furthermore, since they are extracted to some extent by the water used in the extraction stage, they contribute considerably to contamination of the aqueous hydrogenation peroxide product. Purification of the butylanthraquinone to remove such impurities is, therefore, desirable.

It is also desirable to remove or reduce the anthraquinone impurity in butylanthraquinone in view of the low solubility of antraquinone in solvents most frequently used in processes of the above type. Despite the low solubility of anthraquinone, it has been found that metastable solutions of anthraquinone in said solvents crystallize extremely slowly and may require several weeks or months for spontaneous crystallization. The working solution for such a process is generally prepared by dissolving butylanthraquinone at an elevated temperature in a solvent and then cooling the solution to the desired temperature for use. Commercial butylanthraquinone usually contains sufficient anthraquinone to give solutions supersaturated with anthraquinone which slowly crystallizes out plugging filters and orifices in the synthesis system.

It is an object of the invention to provide an effective and practical method for removing unidentified impurities normally present in butylanthraquinone. A further object is to provide a method for removing such impurities and also anthraquinone from butylanthraquinone. Still further objects will be apparent from the following description.

The above objects are accomplished in accordance with the invention by dissolving butylanthraquinone containing impurities of the unidentified type mentioned above in a non-polar solvent and contacting the solution with activated alumina. At least 0.4 and preferably 0.6 to 1.5 parts of activated alumina is used for each part of butylanthraquinone in the solution.

If anthraquinone impurity is also to be removed, there is added to the solution resulting from the treatment with alumina, a polar solvent, such as an alcohol, in a sufficient amount to produce a solution supersaturated with respect to anthraquinone. There is then added a small amount, e. g., 0.1 to 10% based on the weight of butylanthraquinone, of finely crystalline anthraquinone to facilitate crystallization of the anthraquinone. The mixture is let stand, preferably with agitation, for a time ranging from several hours up to about 4 days, and then is filtered to separate anthraquinone. If this seeding technique is not used, a storage time of several weeks or months is required to effect comparable reduction in anthraquinone content.

The unidentified impurities removed by the treatment with activated alumina are hereinafter referred to as "gums." They are strongly adsorbed by activated alumina. Their relative content in butylanthraquinone, or in solutions thereof, can be determined by adsorbing them from solution on activated alumina in a chromatographic column, washing the column with methylene chloride, eluting the gums with methanol and methanolic hydrogen chloride, collecting the eluate, diluting with water and extracting with methylene chloride, evaporating off solvent from the extract and weighing the gum residue. The "gum" contents reported in the examples were determined in this manner.

The invention is illustrated by the following examples. In the examples and elsewhere in the specification all parts and percentages given are on a weight basis unless otherwise specified.

Example 1

84 parts of butylanthraquinone having average "gum" and anthraquinone contents of 0.2% and 2.2%, respectively, was dissolved with agitation and heating in 236 parts of a mixture of methylnaphthalenes. This solvent had a "gum" content of 0.5%. The solution was contacted at about 80° C. with 63 parts of 8–48 mesh (8–48 meshes per linear inch) activated alumina in a fixed bed about one foot deep at a rate of about 4 parts of solution per minute. Finally, the alumina was washed with methylnaphthalene to be used in a succeeding batch. The effluent from the column was mixed with 90 parts of diisobutyl carbinol, cooled to room temperature and seeded with 0.8 part of finely powdered anthraquinone. After 3 days' storage with occasional agitation, the mixture was filtered. The final solution contained 0.06% "gum." Its anthraquinone content was 0.018 part per part of butylanthraquinone. The purified solution did not precipitate anthraquinone at 25 to 55° C. in cyclic reduction-oxidation operations to produce hydrogen peroxide.

The above purification treatment removed about 80% of the "gum" derived from the butylanthraquinone and the methylnaphthalene solvent. The following example shows that when using substantially less activated alumina based on the butylanthraquinone, gum removal is relatively ineffective. When compared with the results of Example 1, it also demonstrates the value of the seeding technique for facilitating anthraquinone removal.

Example 2

730 parts of butylanthraquinone having gum and anthraquinone contents comparable to the butylanthraquinone of Example 1 were dissolved with agitation and heating in 1100 parts of a mixture of methylnaphthalenes similar to that described in Example 1. The mixture was stirred with 120 parts of 100 mesh (100 meshes per linear inch) activated alumina for 2 hours at 90 to 100° C. and then filtered. To the filtrate was added 1630 parts of diisobutyl carbinol, following which 30 additional parts of activated alumina, 20 parts of wet Raney nickel catalyst (to remove trace catalyst poisons) and 10 parts of diatomaceous earth filter aid were added and the solution was filtered after about one hour's agitation at room temperature. The "gum" content of the final solution was 0.27% showing that little or no "gum" was removed. The anthraquinone content was 0.024 part per part of butylanthraquinone. When used in cyclic operations to produce hydrogen peroxide, the solution precipitated anthraquinone which plugged the catalyst filters.

*Example 3*

223 parts of commercial butylanthraquinone having anthraquinone and "gum" contents averaging 2.2% and 0.2%, respectively, were dissolved at 60 to 80° C. in 632 parts of methylnaphthalene containing 0.15% "gum." The solution was passed through a column of 167 parts of 8 to 40 mesh activated alumina at the rate of 3.5 volumes of solution per volume of alumina per hour. The activated alumina was washed with methylnaphthalene to be used in a succeeding batch. There was added to the treated solution 225 parts of diisobutyl carbinol and it was then seeded at about room temperature by the addition of about 2.1 parts of anthraquinone powder. The solution was agitated for about 1 hour, stored 3 days at about room temperature and then filtered. The final solution contained 0.03% gum, showing effective gum removal. The anthraquinone content was 0.018 part per part of butylanthraquinone. Use of the purified solution in a peroxide synthesis system at about 25 to 55° C. employing a palladium-on-alumina catalyst in the hydrogenation stage gave excellent results as regards catalyst performance and freedom from anthraquinone precipitation over a period of several months of continuous operation.

Contact of the solution of butylanthraquinone in a non-polar solvent with activated alumina is preferably effected by flooded column contact using from about 0.6 to 1.5 parts of alumina per part of butylanthraquinone in the solution. Alternatively, the activated alumina may be slurried with the solution then separated therefrom. If the amount of activated alumina is decreased to substantially less than about 0.4 part per part of butylanthraquinone, the objectionable "gums" are not removed to any worth-while extent. Amounts of activated alumina much greater than the preferred amounts, e. g., up to 3 parts or more, are effective but generaly will not be used for economic reasons.

Any non-polar organic solvent can be used to dissolve the butylanthraquinone for treatment with activated alumina. Examples are the hydrocarbons and chlorinated hydrocarbons such as benzene, toluene, the xylenes, heptane, chloroform and methylene chloride. The solvent should, of course, be one in which butylanthraquinone is appreciably soluble. Although the concentration in the solvent is not critical, a solubility of at least 1% is desirable. It is preferred to treat solutions containing at least 5%, and most preferably at least 10%, up to saturation. In the most preferred modification, the solvent chosen will be one which will be a component of the working solution for producing hydrogen peroxide. Examples are the substituted naphthalene hydrocarbons such as $\alpha$-methylnaphthalene, $\beta$-methylnaphthalene and mixtures thereof, the dimethyl naphthalenes and other alkylnaphthalenes, e. g., amylnaphthalene.

The treatment with activated alumina is preferably effected at elevated temperatures, e. g., 50° C. to 100° C., up to the boiling point of the solution, particularly when concentrations of butylanthraquinone exceeding its solubility at room temperature are to be used. However, temperature does not appear critical and, the treatment is effective at room temperature. However, elevated temperatures are definitely preferred since they permit treating more concentrated solutions and reduce the viscosity of the solutions.

When anthraquinone removal is to be effected following the treatment with activated alumina, any polar solvent which is miscible with the non-polar solvent may be added provided it is added in an amount sufficient to cause supersaturation of anthraquinone. The alcohols are quite suitable for this purpose. Also, esters or ethers may be used such as tri-n-butyl phosphate, di-n-butyl sebacate, cyclohexyl acetate, heptyl acetate, anisole, dibutyl ether of ethylene glycol, etc. If an alcohol (or another polar solvent) is to be a component of the working solution in the peroxide synthesis cycle, it is desirable to use the same alcohol for addition to the alumina treated solution of butylanthraquinone. The higher alcohols such as cyclohexanol, methylcyclohexanol and the liquid saturated aliphatic alcohols containing at least 7 carbon atoms are preferred. The primary and secondary nonyl alcohols such as diisobutyl carbinol and 3,5,5-trimethylhexanol-1 are especially suitable as working solution components.

Preferably, the non-polar and polar solvents chosen will be free from any aliphatic unsaturation, particularly if they are to be components of the working solution in a peroxide synthesis cycle in which the purified butylanthraquinone is used as the intermediate.

Seeding with anthraquinone after addition of the polar solvent should be effected at a temperature at which anthraquinone is supersaturated. Room temperature or thereabout is generally satisfactory. If the non-polar and polar solvents used are those which will constitute the solvent for the working solution in the synthesis cycle, the temperature at which anthraquinone precipitation is effected will desirably be no higher, and preferably will be lower, than the temperatures which will obtain in the synthesis cycle. The latter usually will be in the range 25 to 55° C., hence, crystallization of anthraquinone usually will be effected below about 35° C., e. g., at room temperature. A crystallization time after seeding of 3 or more hours is effective; 0.5 to 4 days is preferred. Longer times can be used but generally are not necessary. It has been found that reduction of the anthraquinone content to approach its equilibrium solubility in the working solution is adequate. It has also been found that troublesome precipitation in synthesis operations does not occur even when the final anthraquinone content exceeds slightly such solubility.

The term "activated alumina" is used therein to mean any alumina obtained from natural or synthetic hydrated alumina, which may or may not contain a minor proportion of silica or other materials, by dehydration by heating so as to convert the alumina to a less hydrated form such as $\alpha$-alumina monohydrate, $\gamma$-alumina, or like recognized active forms of alumina. The activating heat treatment should not be sufficient to convert the alumina to the inactive corundum form. Generally, activation is effected by heating at 300 to 800° C. to produce a microporous alumina having extensive surface area. Activated aluminas are well known and are widely used for many purposes.

The particle size of the alumina used can be varied considerably but generally will be in the range of 4 to 200 mesh (4 to 200 meshes per linear inch) when the column method of treatment is used. If the slurry method is used, it will generally be advantageous to use more finely divided alumina. Contact times of the order of those illustrated in the examples are effective but longer or shorter times can be used, it being necessary only that intimate contact between the alumina and the solution being treated be provided. Intimate contact can be readily provided, e. g., by agitating a slurry of the alumina in the solution or by passing the solution through

We claim:

1. The method of purifying 2-t-butylanthraquinone comprising contacting a solution of the impure material in a non-polar solvent from the group consisting of hydrocarbon and chlorinated hydrocarbon solvents which are free from aliphatic unsaturation with at least 0.4 part of activated alumina per part by weight of 2-t-butylanthraquinone in said solution, separating the solution from said alumina and adding thereto a polar solvent which is free from aliphatic unsaturation and is miscible with said non-polar solvent, in an amount sufficient to precipitate anthraquinone originally present as an impurity in the 2-t-butylanthraquinone, seeding the resulting mixture with anthraquinone and storing the mixture to precipitate anthraquinone therefrom, then separating the precipitated anthraquinone from the solution phase of the mixture.

2. The method of claim 1 wherein the solution contacted with activated alumina contains at least 5% by weight of 2-t-butylanthraquinone.

3. The method of claim 1 wherein the non-polar solvent is a hydrocarbon and the polar solvent is an alcohol.

4. The method of claim 3 wherein the non-polar solvent is an alkyl substituted naphthalene hydrocarbon and the polar solvent is a higher alcohol.

5. The method of claim 3 wherein the non-polar solvent is an alkyl substituted naphthalene hydrocarbon and the polar solvent is a liquid aliphatic alcohol containing at least 7 carbon atoms.

6. The method comprising contacting at a temperature of at least 50° C. a solution of impure 2-t-butylanthraquinone in an alkyl substituted naphthalene hydrocarbon solvent which is free from aliphatic unsaturation, with 0.6 to 1.5 parts of activated alumina per part by weight of 2-t-butylanthraquinone in said solution, said solution having a 2-t-butylanthraquinone content of at least 5% by weight, separating the solution from said alumina and adding thereto a higher alcohol which is free from aliphatic unsaturation and is miscible with said hydrocarbon solvent in an amount sufficient to precipitate anthraquinone originally present as an impurity in the 2-t-butylanthraquinone, seeding the resulting mixture with anthraquinone and storing the mixture at about room temperature for a time of from 3 hours to 4 days to precipitate anthraquinone therefrom, then separating the precipitated anthraquinone from the solution phase of the mixture.

7. The method of claim 6 wherein the alcohol is from the group consisting of the primary and secondary nonyl alcohols.

References Cited in the file of this patent

UNITED STATES PATENTS

| | | |
|---|---|---|
| 1,981,305 | Bray et al. | Nov. 20, 1934 |
| 2,499,702 | Umhoefer | Mar. 7, 1950 |
| 2,573,702 | Folkers et al. | Nov. 6, 1951 |

OTHER REFERENCES

Fieser et al.: J. A. C. S. 61, 168 (1939).
Fieser et al.: J. A. C. S. 62, 1360 (1940).